May 7, 1957  F. R. F. RAMSAY  2,791,745
APPARATUS FOR TESTING IGNITION SYSTEMS
FOR INTERNAL COMBUSTION ENGINES
Filed March 3, 1954

Inventor
Frank R. F. Ramsay
By Watson, Cole
Grindle & Watson
Attorneys

United States Patent Office 2,791,745
Patented May 7, 1957

2,791,745

APPARATUS FOR TESTING IGNITION SYSTEMS FOR INTERNAL COMBUSTION ENGINES

Frank Raymond Faber Ramsay, London, England, assignor to D. Napier & Son Limited, London, England, a company of Great Britain Application March 3, 1954, Serial No. 413,879

4 Claims. (Cl. 324—16)

This invention relates to apparatus for testing ignition systems for internal combustion engines, of the kind including an oscillograph adapted for connection to part of the ignition system so as to receive impulses and give indications representing the impulses delivered to the sparking plugs, and means for synchronising the time base of the oscillograph with the cycle of the engine so that figures representing the impulses for a series of sparking plugs are produced by the trace in sequence on the screen of the cathode ray tube or its equivalent. Certain forms of testing apparatus of this general kind are described in United States patent specifications Nos. 2,450,164, 2,487,070 and 2,487,071.

In the apparatus described in the U. S. specifications referred to, the time base of the oscillograph is synchronised with the engine cycle by triggering the time base by a triggering impulse tapped off from one of the sparking plugs. For some purposes, however, this form of synchronisation may be inconvenient or otherwise undesirable.

It is an object of the present invention to provide testing apparatus of the kind specified in which the time base of the oscillograph is synchronised with the engine cycle in another way.

According to the present invention, in a testing apparatus of the kind specified, the time base of the oscillograph is synchronised with the engine cycle by an impulse generated in a pick-up disposed near to a cyclically moving part of the engine, which part is adapted to produce a change of flux through the pick-up at a particular point in its movement which approximately coincides with a particular firing point in the engine cycle.

In order that the nature of the invention may be more clearly understood, and without prejudice to the generality of the appended claims, a particular embodiment will now be described with reference to the accompanying drawings, in which:

Figure 1:
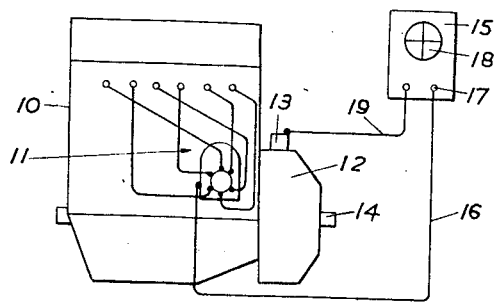
Figure 1 is a view of a six cylinder four-stroke cycle internal combustion engine with magneto ignition connected to an oscillograph for testing in accordance with the invention.

The six cylinder four-stroke cycle internal combustion engine 10 shown in Figure 1 is provided with a magneto 11 which supplies high voltage impulses to the six sparking plugs. Mounted on the flywheel housing 12 of the engine is an electro-magnetic pick-up 13. This may be a permanent fitting provided primarily as a means for ascertaining when tthe engine crankshaft 14 is in the top dead centre position, the flywheel having a hole in its periphery, or a projection thereon, adapted to produce a change of flux through the pick-up each time the hole or projection is in the immediate vicinity of the pick-up, namely at the top dead centre position of the crankshaft. In the present invention the pick-up 13 is used for another purpose, namely for triggering the time base of an oscillograph 15 which is used for testing the operation of the magneto ignition system.

The primary circuit of the magneto 11 is connected by means of a lead 16 to a terminal 17 of the oscillograph, on the screen 18 of which is produced a trace in the vertical sense corresponding to the primary voltage of the magneto. The general arrangement of an oscillograph for this purpose is fully described in the U. S. patents referred to above. The trace is moved in the horizontal sense by means of a conventional time base circuit included in the oscillograph 15 and which is triggered by an external impulse, in this case a voltage impulse received from the pick-up 13 through a lead 19.

Figure 2:
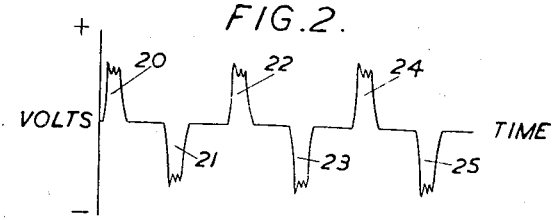
Figure 2 is a diagram showing the voltage of the primary circuit of the magneto during one distributor revolution, i. e. during two crankshaft revolutions.

For reasons described more fully hereinafter, the time base must be triggered not on every crankshaft revolution but on every alternate revolution, with the result that the trace produced on the screen 18 is as shown in Figure 2, in which there are six occasions, illustrated by the peaks 20 to 25, at which voltages are generated in the primary circuit of the magneto 11 for energising the secondary circuit and producing a spark in an engine cylinder. With a magneto ignition system the peaks are positive and negative alternately.

Figure 3:
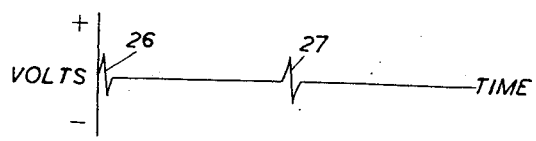
Figure 3 is a diagram showing the impulses received from the pick-up during two crankshaft revolutions.

Since the hole or projection in the engine flywheel will sweep past the pick-up 13 on every revolution, voltage impulses 26 and 27 (Figure 3) will be produced by the pick-up in every revolution. If, therefore, the time base were triggered by every voltage impulse received from the pick-up the trace of the magneto primary voltage would repeat itself after every third peak instead or after every sixth peak, which would be undesirable since the trace would then not present such a clear picture of the ignition process. It is therefore necessary to select alternate impulses from the pick-up so that the time base is triggered by the voltage impulses 26 but not by alternate voltage impulses 27.

Figure 4:
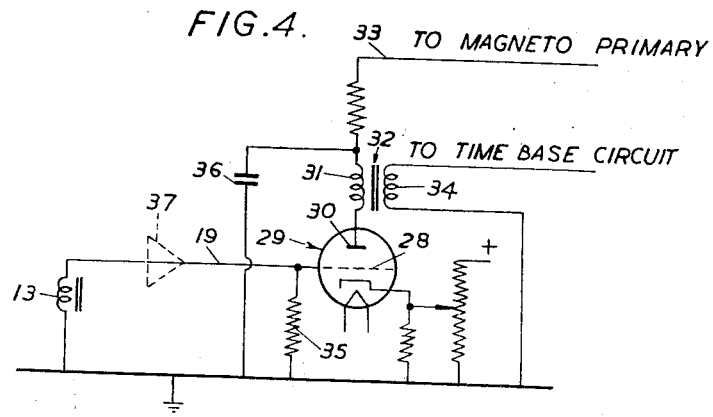
Figure 4 is a circuit diagram.

This can be achieved by a circuit as shown in Figure 4, in which the lead 19 from the pick-up 13 is connected to the grid 28 of a triode 29. The anode 30 is connected through the primary winding 31 of a transformer 32 to the primary circuit of the magneto, for instance the lead 33 shown in Figure 4 may be connected to the back of the terminal 17 shown in Figure 1. The secondary winding 34 of the transformer 32 is connected to the time base circuit for triggering this circuit whenever the secondary winding 34 is energised.

The triode 29 is biassed to cut-off at the maximum positive voltage in the magneto primary circuit, and the pick-up voltage applied to the grid 28 exceeds this bias by a sufficient margin to give an adequate triggering impulse through the transformer 32 to the time base circuit under all operating conditions of the engine. Thus the triode 29 is conductive only when the grid 28 receives a voltage impulse from the pick-up 13 and the anode 30 simultaneously receives a positive voltage impulse from the magneto primary. Thus the triode 29 will be conductive when the pick-up voltage impulse 26 is applied to the grid, since this impulse coincides with the positive magneto primary voltage impulse 20. On the other hand, when the pick-up voltage impulse 27 is applied to the grid the triode will not conduct, because this impulse 27 coincides with the negative magneto primary voltage impulse 23. On the other two positive peaks 22 and 24 of the magneto primary voltage there will be no impulse from the pick-up 13 to the grid 28 so that the triode 29 will also be non-conductive for these peaks. Thus the triode will conduct, and a triggering impulse will be supplied to the time base circuit, only once in two crankshaft revolutions.

For permitting the grid charge to leak away between impulses, a grid leak resistance 35 is provided.

The pick-up 13 is so disposed that it provides an impulse at the top dead centre position of the crankshaft, but the spark will generally be timed to occur several crankshaft degrees before top dead centre. However, in most cases the voltage impulse from the magneto primary circuit will persist at least until the crankshaft is at top dead centre. To ensure this necessary persistence of the primary voltage impulse even at large angles of ignition advance, a time delay or storing device may be provided, such as a condenser 36 in the anode circuit.

If the pick-up impulse is not strong enough to ensure that the triode cut-off bias is exceeded under all operating conditions of the engine, a conventional amplifier 37 could be provided between the pick-up 13 and the triode 29.

While in the arrangement described the means for interrupting the pick-up impulses on every other revolution is a thermionic tube, it would be possible instead to provide an electro-magnetic relay for this purpose, the energising coil of the relay being connected so as to receive current from the magneto primary winding and to attract a magnet for closing the contacts only when the magneto primary voltage is positive.

As a further alternative, a thermionic tube employing a double grid could be used, the impulse from the pick-up 13 being applied to one grid and the impulse from the primary circuit of the magneto being applied to the other grid, the anode being permanently at positive potential and the tube being biassed to cut-off at all times except when both grids are positively charged.

It will be appreciated that the form of the invention described above is only suitable for use with engines of the type in which there is an odd number of firing positions per crankshaft revolution, since in engines with an even number of firing positions per crankshaft revolution an impulse of the same polarity would be received from the primary circuit of the magneto at or near the top dead centre position at every crankshaft revolution, instead of at every other crankshaft revolution. The system described would also be unsuitable for engines having a coil ignition system in which the primary voltage of the ignition system is always of the same polarity. For such engines in which the apparatus described above could not be used, it would be necessary to provide a pick-up whose flux is influenced by an engine part which moves cyclically at half crankshaft speed, for instance a member forming part of or connected to the camshaft.

On the other hand, a pick-up associated with the engine flywheel as shown in Figure 1 could be used for triggering the time base of an engine working on the two-stroke cycle in which the sequence of ignition impulses is repeated at each crankshaft revolution, without having to provide interrupting means in the pick-up circuit.

What I claim as my invention and desire to secure by Letters Patent is:

1. Apparatus for testing the ignition system of a spark ignition four-stroke cycle internal combustion engine, having an odd number of firing positions per crankshaft revolution, said ignition system including a magneto the primary circuit of which produces alternate voltage impulses of opposite polarity, comprising an oscillograph, a time base circuit in said oscillograph, a pick-up which co-operates with a part of said engine which moves cyclically at crankshaft speed to generate an electrical impulse at a particular point in the movement of said part, alternate electrical impulses corresponding approximately with a particular firing point in the engine cycle, means for conveying electrical impulses from said pick-up to said time base circuit for triggering said time base circuit, and means for permitting said electrical impulses to traverse said conveying means only when said magneto primary circuit is producing a voltage impulse of a particular polarity.

2. Apparatus as claimed in claim 1, in which the means for permitting said impulses to travel from the pick-up to the time base circuit comprises a thermionic tube adapted to be conductive only when said pick-up is producing an electrical impulse and said magneto primary circuit is producing a voltage impulse of positive polarity.

3. Apparatus as claimed in claim 2 in which said thermionic tube is a triode, the pick-up is connected to the grid of said triode, and the magneto primary circuit is connected to the anode of said triode, there being a connection between the anode circuit of said triode and the time base circuit of the oscillograph for transmitting a triggering impulse to the time base circuit only when the triode is conductive.

4. Apparatus for testing the ignition system of a four-stroke cycle internal combustion engine having an odd number of firing positions per crankshaft revolution, said ignition system generating alternate voltage impulses of opposite polarity, comprising an oscillograph, a time base circuit in said oscillograph, a pick-up which cooperates with a part of said engine which moves cyclically at engine speed to generate an electrical impulse once in each engine revolution, means for conveying electrical impulses from said pick-up to said time base circuit for triggering said time base circuit, and means responsive to voltage impulses of one polarity generated by the ignition system which permit the said electrical impulses generated by the pick-up to traverse said conveying means only when said voltage impulses are of said one polarity, whereby only every alternate electrical impulse from said pick-up triggers said time base.

References Cited in the file of this patent

UNITED STATES PATENTS

| | | |
|---|---|---|
| 2,263,859 | Eldredge | Nov. 25, 1941 |
| 2,688,126 | Weller | Aug. 31, 1954 |